J. Broughton,
Circular Sawing Machine.

Nº 15,368.

Patented July 22, 1856.

UNITED STATES PATENT OFFICE.

JNO. BROUGHTON, OF CHICAGO, ILLINOIS.

METHOD OF DRIVING CIRCULAR SAWS.

Specification of Letters Patent No. 15,368, dated July 22, 1856.

*To all whom it may concern:*

Be it known that I, JOHN BROUGHTON, of Chicago, in the county of Cook and State of Illinois, have invented a new and useful Improvement in Cut-Off or Crosscut Sawing Machines Provided with Circular Saws; and I do hereby declare that the following is a full, clear, and exact description of the same, reference being had to the annexed drawings, making a part of this specification, in which—

Figure 1:
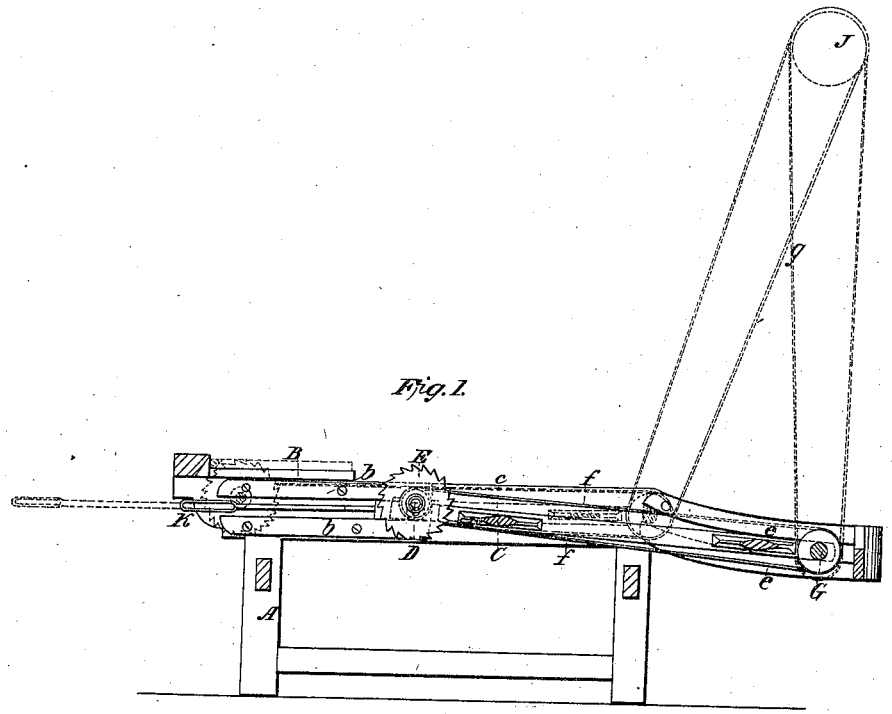
Figure 2:
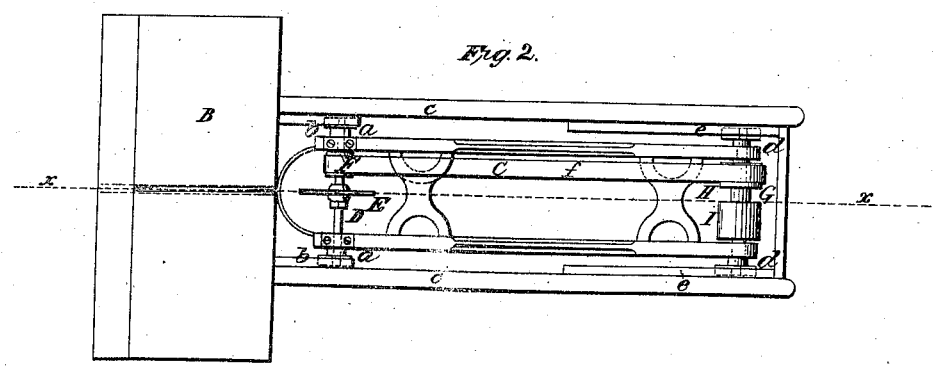

Figure 1, is a longitudinal vertical section of my improvement, *x, x*, Fig. 2, showing the plane of section. Fig. 2, is a plan or top view of ditto.

Similar letters of reference indicate corresponding parts in the two figures.

My invention consists in placing the saw within a sliding frame, the back end of which, is fitted or works in ways or guides which form segments of circles of which the driving shaft is the center. The front end of the frame works between horizontal ways or guides, and the several parts are so arranged, as will be hereinafter fully shown and described, that a sliding saw and stationary table is obtained and the saw operated with a small number of pulleys and a small amount of belting.

To enable those skilled in the art to fully understand and construct my invention, I will proceed to describe it.

A, is a rectangular frame which may be constructed in any proper manner, and B, is a table which is placed at one end of the upper part of said frame.

This table may be constructed of a single plank placed transversely on the frame and it forms the bed on which the plank or log to be cut is placed.

C, represents a frame of rectangular form which is fitted in the upper part of the frame A, the front end of the frame C, having a pin at each side, which pins are fitted to blocks *a*, which work between horizontal guides or ways *b, b*, attached to the inner sides of the top plates, *c, c*, of the frame A. The back end of the frame C, has also a similar pin attached to it, one at each side, which pins are fitted in blocks *d*, said blocks being fitted and working between segment guides or ways *e*, which are also attached to the inner sides of the plates *c, c*. In the front part of the frame C, the saw arbor D, is placed; E, is the circular saw and F is a pulley which are placed on said arbor. In the back end of the frame C, an arbor G, is placed, said arbor having two pulleys H, I, upon it. Around the pulley H, a belt *f*, passes, said belt also passing around the pulley F, on the saw arbor D, and *g*, is a belt which passes around the pulley I, said belt also passing around a pulley on the driving shaft J, which is placed above the machine and at a point which is the center of a circle of which the segment ways or guides *e*, are parts, or parts of circles, having the same diameter. This will be understood by referring to Fig. 1. To the front end of the frame C, a rod K, is attached.

The operation is as follows, As the driving shaft J, rotates, motion is given the saw by the belts *g, f*. A plank or log being laid on the table B, the operator takes hold of the rod K, and draws the frame C, and saw E, forward and cuts off the plank or log. Then by letting go the handle or giving it a slight touch, it slides back to its former position. On reference to the drawing, it will be seen that while the saw and arbor move forward in a horizontal line, the arbor and pulleys on the back end of the frame C, will move in an arc of a circle, whose center is at the shaft J, while the pins at the side of the frame, vibrating in their bearings or blocks *a, d*, allow the frame to pass from an inclined to a horizontal position. This arrangement, while admitting of a sliding saw, and stationary table, will allow the saw to be driven with the smallest number of pulleys and the least amount of belting. The weight of the pulleys H, I, and the end of the frame C, hanging in the belt *g*, would give it a proper tension and dispense with any hammer, but the curved or segment guides *e*, are used to prevent lateral motion, or vibration and insure a steady action of the frame C. They also serve to carry back the saw, as the frame C, when the operator lets go of the rod K, will have a tendency to run down the incline to its former position.

The machine is simple in construction and very smooth in action; there are no friction pulleys and the belts work in the simplest manner by merely passing around the actual driving pulleys. The whole of the working parts are immediately before the eye of the operator, are very accessible for the purpose of oiling and very likely to attract his attention in case lubrication is required, thus lessening greatly the liability to wear by the parts being concealed and the neglect of oiling.

Having thus described my invention, what what I claim as new and desire to secure by Letters Patent, is—

The sliding frame C, placed and working between the horizontal and segment guides or ways $b$, $e$, in the frame A, the frame C, having the saw E, placed within it and driven by the belts $f$, $g$, from the shaft J, arranged relatively with the frame C, as shown and described, for the purpose specified.

JOHN BROUGHTON.

Witnesses:
 CALVIN D. WOLF,
 CH. FIELDKAMP.